(12) United States Patent
Kerns

(10) Patent No.: US 6,363,908 B1
(45) Date of Patent: *Apr. 2, 2002

(54) METHOD FOR ENSURING COMBUSTION OF EVAPORATIVE FUEL IN A STRATIFIED CHARGE ENGINE USING MULTIPLE FUEL INJECTION PULSES

(75) Inventor: James Michael Kerns, Trenton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/630,887

(22) Filed: Aug. 2, 2000

(51) Int. Cl.$^7$ .......................... F02B 17/00; F02M 33/00
(52) U.S. Cl. ........................................ 123/295; 123/520
(58) Field of Search ................................ 123/295, 299, 123/300, 304, 430, 520, 698

(56) References Cited

U.S. PATENT DOCUMENTS

| | | | |
|---|---|---|---|
| 5,245,975 A | 9/1993 | Ito | 123/520 |
| 5,438,967 A | 8/1995 | Ito | 123/339.12 |
| 5,657,625 A | 8/1997 | Koga et al. | 60/274 |
| 5,806,304 A | 9/1998 | Price et al. | 60/274 |
| 5,910,096 A * | 6/1999 | Hepburn et al. | 60/274 |
| 6,148,802 A * | 11/2000 | Moser et al. | 123/518 |
| 6,176,217 B1 * | 1/2001 | Ohkuma et al. | 123/295 |
| 6,178,944 B1 * | 1/2001 | Kerns et al. | 123/295 |
| 6,192,672 B1 * | 2/2001 | Kerns | 60/274 |
| 6,192,674 B1 * | 2/2001 | Kerns | 60/285 |
| 6,230,484 B1 * | 5/2001 | Kerns | 60/274 |
| 6,233,924 B1 * | 5/2001 | Kerns | 60/284 |

FOREIGN PATENT DOCUMENTS

| | | |
|---|---|---|
| EP | 1 083 321 A | 9/2000 |
| GB | 2 335 001 A | 9/1999 |

* cited by examiner

Primary Examiner—Willis R. Wolfe
Assistant Examiner—Hai Huynh
(74) Attorney, Agent, or Firm—John Russell

(57) ABSTRACT

A method for operating a direct injection spark ignition engine in stratified mode and dual mode is presented. The method includes determining a fuel fraction in a fuel vapor canister; determining whether the fuel vapor canister should be purged; performing purge flow from the fuel vapor canister to a cylinder of the engine; and supplying purge flow and injected fuel to a cylinder of the engine during an intake stroke and supplying injected flow during a compression stroke so that the engine operates in the combined homogeneous and stratified charge mode. The method also includes controlling the purge flow and the injected fuel supplied to balance an amount of fuel supplied during the intake stroke and the compression stroke. The step of controlling calculates the amount of fuel to be injected and includes adjusting the amount of fuel supplied based on an amount of purge supplied to the cylinder.

15 Claims, 2 Drawing Sheets

METHOD FOR ENSURING COMBUSTION OF EVAPORATIVE FUEL IN A STRATIFIED CHARGE ENGINE USING MULTIPLE FUEL INJECTION PULSES

BACKGROUND OF THE INVENTION

1. Field of the Invention

The invention relates to a method of operating an engine. More specifically, it relates to a method for operating an engine to allow evaporative emission purge during operation of an engine in a dual combustion mode.

2. Discussion of the Related Art

Internal combustion engines can be coupled to fuel vapor recovery systems to allow purging of fuel vapors generated in the fuel tanks. Conventional systems control total purge flow based on an estimated purge fuel vapor concentration representing the amount of fuel vapor contained in the total purge flow from the fuel system. Fuel injection control is also adjusted based on this estimated purge concentration.

The present inventor developed a method for accurately determining the cylinder fuel vapor purge concentration. This invention was disclosed in U.S. application Ser. No. 09/366,124, and its disclosure is incorporated herein by reference. By knowing the cylinder fuel vapor purge concentration as well as the concentration in the fuel vapor recovery system, control of the operation of the engine can be accomplished. The inventor also has developed a method for determining the overall fuel vapor purge concentration. This invention was disclosed in U.S. application Ser. No. 09/055,500, and its disclosure is also incorporated herein by reference.

Direct injection spark ignition (DISI) engines can operate in multiple modes of operation. These modes can include a homogeneous mode where the air-fuel mixture is injected during the intake stroke; a stratified mode where additional fuel can be added during the compression stroke; and a combined or dual mode that allows injection on the intake stroke and further injection of fuel during the compression stroke. The combined mode is especially useful for high load conditions and knock resistance.

Multiple injections can also used to make transitions between the stratified and homogeneous modes and to extend the envelope of non-homogeneous operation.

In the dual mode, it is difficult to control the proper amount of fuel so that it is balanced and will not produce unburned hydrocarbons or over fuel/over torque the engine. Currently there is no way to control the total quantity of fuel burned to provide a desired torque output from the engine and to balance the amount of fuel supplied by each of the various sources (canister purge vapor, fuel injected during the intake stroke, fuel injected during the compression stroke) so that the homogeneous portion of the cylinder charge is at an air-fuel ratio that provides reliable combustion and acceptable emissions when ignited and the stratified portion of the charge provides reliable ignition as well as providing the final portion of fuel necessary to deliver the desired torque. Further, there is currently no method for maximizing the usage of fuel vapors from the purge system.

None of the prior art allows for a balanced control of the engine in the dual mode when the carbon canister is feeding purge vapor to the engine cylinders. Typically, if the purge fuel vapor is added to the engine in the prior art structures, the mixture is often too lean to burn and the fuel is wasted. In some cases, the unburned hydrocarbons are used to warm up the catalyst but this usually increases emissions and does not provide a balanced control to solve the above-mentioned problems.

SUMMARY OF THE INVENTION

An object of the present invention is to use the fuel vapor concentration to control the operation of the engine, especially when the engine is operating in dual mode.

It is a further object of the present invention to provide a method that uses purge flow from the carbon canister with a minimum impact on fuel economy and pollution.

During stratified operation of a DISI engine, the fuel is injected during the compression stroke which creates a region of combustible mixture in only a portion of the cylinder which is surrounded by a non-combustible mixture of air and exhaust residuals. In the dual mode of operation, fuel is injected on the intake stroke to provide a lean, nearly homogeneous air fuel mixture throughout the cylinder, then additional fuel is injected during the compression stroke to create a region of richer mixture that will be easier to ignite with the spark plug.

If fuel vapors from the carbon canister are introduced to the intake manifold, this fuel will be mixed throughout the cylinder. During stratified operation, the portion of the evaporative fuel that is in the rich region will burn. The fuel in the remainder of the cylinder will burn (and produce torque) only if it is rich enough.

If the overall mixture is too lean, it will not burn and this results in higher feed gas hydrocarbon emissions and increased catalyst temperatures. Also, this fuel will be consumed without producing useful work resulting in a lower fuel economy. If the overall mixture is near the lean limit of flammability, it may burn during some combustion events and not burn during others and this will result in rough engine operation. Further, if the canister is not purged during stratified operation, it can be overfilled and inadequately purged during typical operation. However, if the engine is run in a homogeneous mode more often to allow for more canister purge, the fuel economy benefit from stratified operation is reduced.

In the dual mode, it is desirable to control the total quantity of fuel burned to provide a desired torque output from the engine and further, to balance the amount supplied by each of the various sources (canister purge vapor, fuel injected during the intake stroke, fuel injected during the compression stroke) such that the homogenous portion of the cylinder charge is at and air-fuel ratio that provides reliable combustion (and acceptable emissions) once ignited and the stratified (richer) portion of the charge provides reliable ignition as well as providing the final portion of the fuel necessary to deliver the desired torque. Also, maximizing the usage of fuel vapors from the evaporative purge system is desired to maximize the purge of the carbon canister during vehicle operation. To provide the proper balance, a total fuel quantity desired is determined; this fuel is then apportioned between fuel supplied during the intake stroke and fuel supplied during the compression stroke. Further, the fuel supplied during the intake stroke is comprised of fuel vapors from the carbon canister and fuel injected during the intake stroke.

In general if Ft is the total fuel desired, then the sum of Fp (the fuel that is available from the canister purge system), Fh (the fuel injected during the intake stroke) and Fs (the fuel injected during the compression stoke) should equal Ft:

$$Fp+Fh+Fs=Ft.$$

Further, in the homogenous portion of the charge, given a mass of air in the cylinder (MA) and a desired homogenous air fuel ratio (AFh), the fuel supplied during the intake stroke should satisfy the equation:

$$MA/(F_p+F_h)=AF_h.$$

The resulting air fuel ratio measured in the exhaust system (AFx) would be:

$$AF_x=MA/(F_p+F_h+F_s)$$

Alternately, when it is adequate for the homogenous portion of the charge to simply be within a range of air fuel ratios (AFhMin, AFhMax) then:

$$AF_nMin<MA/(F_p+F_h)<AF_hMax$$

where AFnMin would be a minimum combustible air fuel ratio, and AFhMax would be the maximum air fuel ratio desired for acceptable emissions.

If the fuel quantity that will be supplied by the carbon canister is not currently known, the homogenous fuel can initially be supplied by injection. Then as flow from the carbon canister is induced the homogenous injected fuel is reduced to maintain the desired overall air fuel ratio. The amount of reduction provides the information necessary to determine the fuel content of the purge flow. Conversely, once the fuel content of the purge is known, a purge flow can be commanded that will provide as much fuel as possible without exceeding the desired homogenous air fuel ratio. If the fuel from the purge is insufficient to provide the desired, combustible, air fuel ratio additional fuel would be injected during the intake stroke to make up the deficit.

The basic operation of the method of operating the engine includes the following steps. Determine whether the canister purge is desired based on the time since the purge was active, or if the purge is currently active, continue purging the canister if the estimated purge fuel composition contains more fuel than some predetermined value. Given the current engine speed and torque requirements, determine a target air charge or manifold pressure for semi-stratified or dual mode operation. If the purge composition (fuel fraction) is known, then determine the purge flow required to deliver the required homogeneous fuel. If the fuel flow that is required exceeds a predetermined flow capability, determine the fuel available at the maximum purge flow and then calculate how much additional fuel needs to be injected during the intake stroke (if this is below a minimum quantity that can be reliably injected, reduce purge flow to allow for a minimum injection quantity or pulse width).

A feedback from an exhaust sensor can be used to refine the estimate of the purge composition similar to the current practice.

If the purge composition is not known, all of the homogeneous fuel can be provided via the intake stroke injection. Then the amounts of purge flow introduced into the intake manifold can be gradually increased while modifying the quantity of fuel injected during the intake stroke to maintain the desired total quantity of fuel using a sensor in the exhaust system for feedback. The purge composition can be determined based on the estimated volume of the purge flow and the magnitude of the change required in the injected fuel that is similar to the current practice.

Finally, the remaining fuel that must be injected to form a richer portion of the cylinder charge is determined. The remaining fuel is determined by subtracting the homogeneous fuel quantity from the total fuel required for the desired engine operation.

The objects of the present invention are achieved by a method of operating an engine comprising the steps of: allowing purge flow from the fuel vapor canister to a cylinder of the engine; supplying purge flow and a first injected fuel to the cylinder of the engine during an intake stroke and supplying a second injected fuel during a compression stroke so that the engine operates in a dual mode including both homogeneous operation and stratified charge operation; and adjusting the purge flow and the first injected fuel supplied to provide a predetermined amount of homogeneous fuel during the supplying steps so as to balance an amount of fuel supplied during the intake stroke and the compression stroke.

The objects of the present invention can also be achieved by a method for operating an engine, comprising the steps of includes determining a fuel fraction in a fuel vapor canister; determining whether the fuel vapor canister should be purged; performing purge flow from the fuel vapor canister to a cylinder of the engine; supplying purge flow and injected fuel to a cylinder of the engine during an intake stroke and supplying injected flow during a compression stroke so that the engine operates in the combined homogeneous and stratified charge mode; controlling the purge flow and the injected fuel supplied so as to balance an amount of fuel supplied during the intake stroke and the compression stroke, and calculating the amount of fuel to be injected during the intake stroke and during the compression stroke, and adjusting the amount of fuel supplied during the intake stroke based on an amount of purge supplied to the cylinder.

An advantage of the present invention is the ability of using the evaporative emission purge during dual mode operation of the DISI engine by making it sufficiently rich to burn.

Another advantage of the present invention is to allow the canister to be purged even during extensive lean operations without reverting to operation in the homogeneous mode that will lower fuel economy.

Other objects, features and advantages of the present invention will be readily appreciated by the reader of this specification.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which.

DETAILED DESCRIPTION OF THE PREFERRED EMBODIMENTS

Figure 1:
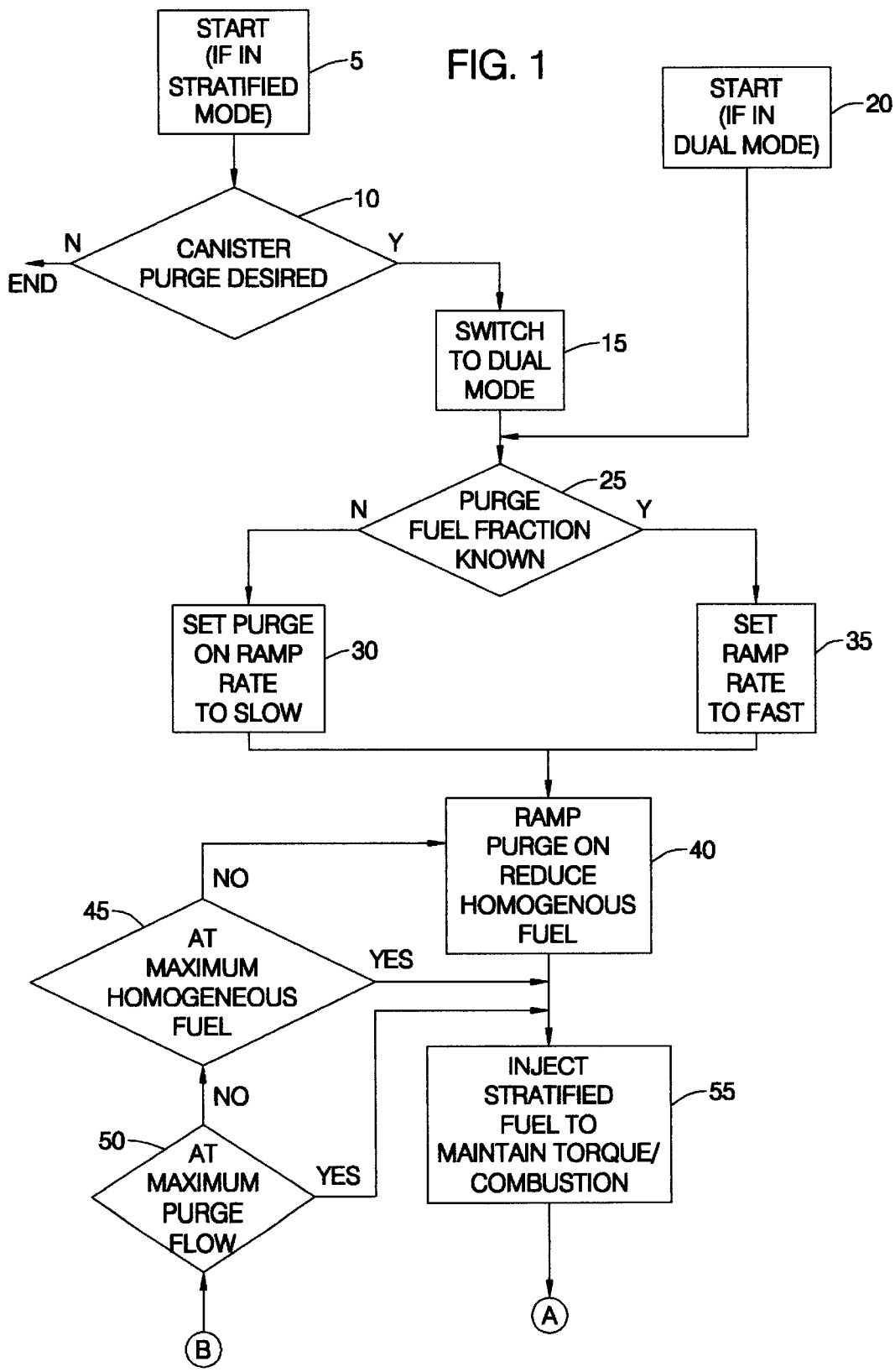
FIG. 1 is a schematic view of a first part of a flowchart describing the operation of the engine according to an embodiment of the present invention.
Figure 2:
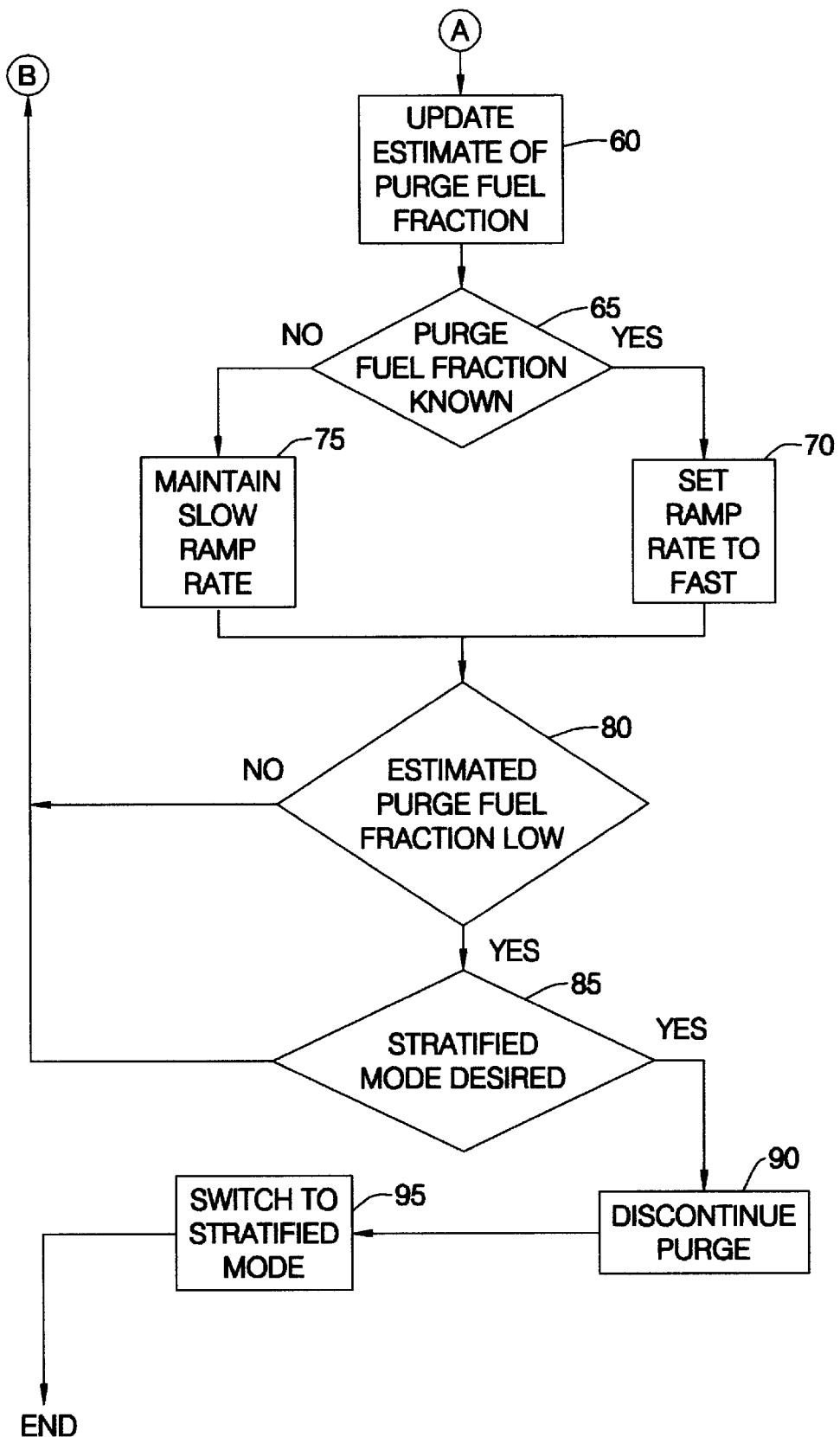
FIG. 2 is a schematic view of a second part of a flowchart describing the operation of the engine according to an embodiment of the present invention.

A method of operating a DISI engine is presented in conjunction with FIGS. 1 and 2. The method for operating the engine according the present invention will now be discussed.

If a direct injection engine is operating in a stratified mode, the process begins with step 5. It is then tested to see if it is desired to purge the fuel vapors from the carbon canister in step 10. If a purge is not desired then the program ends. However, if it is estimated, based on the time since the canister was last purged, that purge is desired, then the next step will be to transition the engine to dual mode combustion in step 15. This means that some of the fuel will be injected during the intake stroke to provide a homogenous mixture and the remainder of the required fuel will be injected during the compression stroke to maintain combustion and deliver the desired engine torque.

A target air/fuel ratio for the homogenous portion of the charge is determined so that it will provide a stable combustion and acceptable exhaust emissions (with minimum throttling as throttling increases pumping losses). This also allows the required homogenous fuel quantity to be determined. To maintain this homogenous air fuel ratio without injecting more fuel than is needed to provide the desired torque, it may be necessary to somewhat reduce the airflow (for example, by changing the throttle position) into the engine to make this transition.

The quantity of fuel required for the stratified portion of the charge is also determined. From the intake airflow and the target homogenous and stratified fuel flows, a target overall air fuel ratio that can be measured by a sensor in the exhaust system is calculated.

If the engine is already operating in the dual injection mode, as shown in step 20, this transition to dual mode would not be necessary. Please note that the description herein assumes that the canister purge will always be desired while in the dual injection mode. This figure also does not address canister purge during homogenous operation, where all of the fuel is injected during the intake stroke, since the control and combustion of the fuel vapors from the canister will be similar to the current practice.

If the canister purge has been off for only a limited time, the previous estimate of the fuel fraction of the purge flow may still be adequate. In this case, if the purge fuel fraction is known from step 25, the rate of change of the purge flow used while activating the purge would be set to the value used during normal operation. Thus the ramp rate can be set to fast in step 35. Otherwise, if the purge fuel fraction is not known in step 25, then a slower ramp rate is chosen in step 30, to avoid air fuel ratio disturbances.

As the purge flow is increased, the fuel injected during the homogenous injection is reduced in step 40 such that the total fuel in the cylinder remains nearly constant. A feed forward change in the injected fuel is made based on the estimate of the purge fuel and a feedback correction made using the signal from the exhaust gas oxygen sensor and the above determined overall air fuel ratio target.

After injecting the fuel required for the homogenous portion of the charge, the remaining fuel required is injected during the compression stroke in step 55 so as to maintain torque and combustion.

Using the measured overall air fuel ratio, the measured or estimated air flow, the quantity of fuel injected, and an estimate of the total flow through the purge system, the fraction of the purge flow that comprises fuel vapor can be estimated using current methods in step 60 so as to update the estimate of purge fuel fraction.

If the above estimate is considered to be sufficiently accurate (e.g. purge has been on long enough) and in step 65 it is determined that the purge fuel fraction is known, the ramp rates for changing the purge flow can be set to normal values in step 70 so as to set the ramp rate to fast. Otherwise, the slow ramp rates will remain in use in step 75 so as to maintain the slow ramp rate.

After some time, it is likely that the purging process will reduce the total fuel content in the carbon canister. Thus, this reduces the fuel fraction in the purge flow. Step 80 tests to see if the purge fuel fraction is low. If it is low, it is determined in step 85, whether it is desired to operate in the stratified mode. If it is desired to operate in the stratified mode, then the purge flow will be stopped in step 90 so as to discontinue the purge. The control system can then transition into the stratified fuel mode in step 95 and the program will be terminated until the canister purge is again desired.

If there is still a significant amount of canister purge fuel present as determined in step 80 or if the stratified mode is not desired as determined in step 85, the canister purge operation continues. A test is then performed to determine if the purge flow is at its maximum value in step 50. If so, then the flow rate (duty cycle) is not increased. If the purge system is not at its maximum purge flow, but the fuel from the purge system is equal to the total of the required homogenous fuel as determined in step 45, the flow rate is also not increased.

If the purge fuel exceeds the total homogenous fuel required, or if it is anticipated that a change in the desired torque would cause the purge fuel to exceed the total homogenous requirement at the anticipated torque, the purge flow is decreased and the process continues with step 55.

If the purge fuel does not exceed the limits and the duty cycle is not at its maximum, the duty cycle can be increased at the appropriate ramp rate in step 40.

Thus, the method of using the purge flow during the dual mode until the purge fuel fraction is low and entry into the stratified mode is desired.

While the present invention has been described in connection with DISI engines, it is possible to use this method on other types of engines that can operate in dual mode.

While it has been described that the purge value can be set to a fast or slow ramp rate, it is possible to use only one speed such as a slow ramp rate and this will remove the necessity for steps, 25, 30, 35, 65, 70 and 75. Also, it is also possible to eliminate the second determination of the purge fuel fraction in steps 65, 70 and 75 if the initial determination is acceptable. Alternatively, it is also possible to use a multiple ramp rates that depend on engine conditions.

Further, it is also recognized that it is possible to monitor the purge flow based on other estimates of the fuel vapor accumulation.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A method of operating an engine, said method comprising the steps of:
   allowing purge flow from the fuel vapor canister to a cylinder of the engine;
   supplying purge flow and a first injected fuel to the cylinder of the engine during an intake stroke and supplying a second injected fuel during a compression stroke so that the engine operates in a dual mode including both homogeneous operation and stratified charge operation; and
   adjusting the purge flow and the first injected fuel supplied to provide a predetermined amount of homogeneous fuel during said supplying steps so as to balance an amount of fuel supplied during the intake stroke and the compression stroke.

2. The method of operating an engine according to claim 1, wherein said step of adjusting includes varying an amount of the second injected fuel supplied during the compression stroke.

3. The method of operating an engine according to claim 2, wherein said step of adjusting includes decreasing an amount of the second injected fuel supplied during the compression stroke.

4. The method of operating an engine according to claim 1, wherein said step of adjusting includes varying an amount of the first injected fuel supplied during the intake stroke to ensure complete combustion of the homogeneous charge.

5. The method of operating an engine according to claim 4, wherein said step of adjusting includes increasing an amount of the first injected fuel to ensure complete combustion of the homogeneous charge.

6. The method of operating an engine according to claim 1, further comprising the step of determining a torque amount of the engine and wherein said step of adjusting includes varying the second injected fuel supplied to the compression stroke to approach a predetermined torque amount.

7. The method of operating an engine according to claim 1, further comprising the steps of determining a torque amount of the engine and adjusting the injected fuel supplied to the compression stroke to approach a predetermined torque amount.

8. A method of operating a direct injection spark ignition engine using multiple fuel injection pulses, said method comprising the steps of:
   providing an engine capable of operating in a combined homogeneous and stratified charge mode;
   determining a fuel fraction in a fuel vapor canister;
   performing purge flow from the fuel vapor canister to the cylinder of the engine;
   supplying purge flow and injected fuel to a cylinder of the engine during an intake stroke and supplying injected flow during a compression stroke so that the engine operates in the combined homogeneous and stratified charge mode; and
   controlling the purge flow and the injected fuel supplied during said supplying steps so as to balance an amount of fuel supplied during the intake stroke and the compression stroke, wherein said step of controlling calculates the amount of fuel to be injected during the intake stroke and during the compression stroke.

9. The method of operating an engine according to claim 8, wherein said step of controlling includes decreasing an amount of the injected fuel supplied during the compression stroke based on the fuel fraction determined in said step of determining.

10. The method of operating an engine according to claim 8, wherein said step of controlling includes varying an amount of the injected fuel supplied during the intake stroke to ensure complete combustion of the homogeneous charge.

11. The method of operating an engine according to claim 10, wherein said step of controlling includes increasing an amount of the injected fuel supplied during the intake stroke to ensure complete combustion of the homogeneous charge.

12. The method of operating an engine according to claim 8, further comprising the steps of determining a torque amount of the engine and adjusting the injected fuel supplied to the compression stroke to approach a predetermined torque amount.

13. A method of operating a direct injection spark ignition engine using a plurality of fuel injection pulses, said method comprising the steps of:
   providing an engine capable of operating in a combined homogeneous and stratified charge mode;
   determining a fuel fraction in a fuel vapor canister;
   determining whether the fuel vapor canister should be purged;
   performing purge flow from the fuel vapor canister to a cylinder of the engine;
   supplying purge flow and injected fuel to a cylinder of the engine during an intake stroke and supplying injected flow during a compression stroke so that the engine operates in the combined homogeneous and stratified charge mode; and
   controlling the purge flow and the injected fuel supplied during said supplying steps so as to balance an amount of fuel supplied during the intake stroke and the compression stroke, wherein said step of controlling calculates the amount of fuel to be injected during the intake stroke and during the compression stroke, and includes adjusting the amount of fuel supplied during the intake stroke based on an amount of purge supplied to the cylinder.

14. The method of operating an engine according to claim 13, wherein said step of controlling includes decreasing the amount of fuel supplied during the compression stroke.

15. The method of operating an engine according to claim 13, wherein said step of controlling further includes determining when a fuel vapor amount in the fuel vapor canister is below a predetermined amount.

* * * * *